Feb. 12, 1963 A. M. SPRINGER 3,077,587

MAGNETIC RECORDING AND PLAY-BACK SYSTEMS

Filed Sept. 6, 1957 2 Sheets-Sheet 1

INVENTOR:

Anton Marian Springer by Erwin Salzer

Atty.

Feb. 12, 1963 A. M. SPRINGER 3,077,587

MAGNETIC RECORDING AND PLAY-BACK SYSTEMS

Filed Sept. 6, 1957 2 Sheets-Sheet 2

INVENTOR.
Anton M. Springer
BY
Erwin Salzer Atty.

3,077,587
Patented Feb. 12, 1963

3,077,587

MAGNETIC RECORDING AND PLAY-BACK SYSTEMS

Anton Marian Springer, Bad Homburg vor der Hohe, Germany, assignor to Telefonbau und Normalzeit G.m.b.H., Frankfurt am Main, Germany, a firm of Germany Filed Sept. 6, 1957, Ser. No. 682,535
9 Claims. (Cl. 340—174.1)

Figure 1:
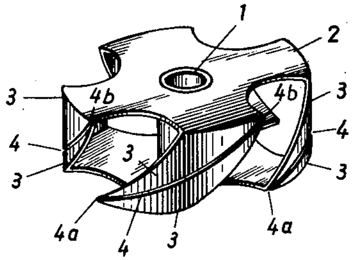

This invention relates to magnetic devices for storing magnetic impressions of electric currents, particularly electric signal currents, on a magnetic storage medium, preferably magnetic tape, and for reproducing said impressions in form of electric currents, or signal currents, respectively.

It is one object of this invention to provide devices of the aforementioned character which have an improved electromagnetic transducer adapted to be used selectively as recording head and as play-back head.

It is another object of the invention to provide improved rotatable magnetic systems for transforming audio currents permitting to accelerate, or decelerate, the speed of reproduction, or speed of play-back, of audio records without changing the pitch of the sounds involved.

Systems of the aforementioned character are disclosed in the copending patent application of Anton Marian Springer, Rotatable Magnetic Systems for Transforming Audio Currents, filed October 29, 1956, Ser. No. 618,766, now Patent No. 3,022,383, and it is one object of this invention to improve the systems disclosed in the aforementioned copending patent application particularly in regard to the transducer structure thereof.

The rotatable electromagnetic transducer which is disclosed in the aforementioned copending patent application and which can be used both as a recording head and as a play-back head is substantially cylindrical in shape. A magnetic core arranged in the center of the transducer structure is associated with one single magnet coil. The flux linkages of a plurality of magnetic systems extend through the aforementioned core and the aforementioned winding which, in other words, are both elements common to the flux paths of each of said plurality of magnetic systems. The gap formed between each pair of pole members of opposite polarity of each of said plurality of magnetic systems is substantially coextensive with a generatrix of the cylindrical electromagnetic transducer structure. The height of the transducer structure and the width of the magnetic recording tape are substantially the same. Transducers of this kind may be used to record, or to play back, a plurality of sound tracks, each of the sound tracks extending more or less transversely to the direction of travel, or movement, of the tape. The highest frequency capable of being recorded, and reproduced, by means of a magnetic recorder having a recording and play-back transducer of the aforementioned kind is determined by the speed of the magnetic recording medium or tape.

It is one of the objects of this invention to modify and thereby improve the structure disclosed in the aforementioned copending patent application, to make it suitable for recording frequency ranges of increased band width, the signals involved being either audio signals, or video signals.

In certain applications it is desirable to arrange the magnetic track, e.g. the sound track, obliquely, i.e. at a predetermined acute angle in respect to the direction of the movement of the magnetic storage medium, or magnetic tape. The electromagnetic transducers used in oblique sound track systems as recording heads, or play-back heads, respectively, are provided with a plurality of magnet systems each including a separate energizing winding and each having an oblique gap formed between pole members of opposite polarity, the gaps formed by all of the magnetic systems being arranged coextensive with a cylindrical tape-guiding surface. In other words, the composite transducer is made up of a plurality of separate transducers forming a structural unit having a plurality of helical recording or play-back gaps on the cylindrical radially outer surface thereof. Such a multi-unit transducer is difficult to be manufactured in relatively small size, i.e. it tends to be extremely bulky.

It is, therefore, another object of the invention to provide magnetic recording and play-back systems of the oblique magnetic track type which lend themselves to being readily manufactured in relatively small sizes, and having substantially less bulk than other comparable oblique track systems.

Figure 1A:
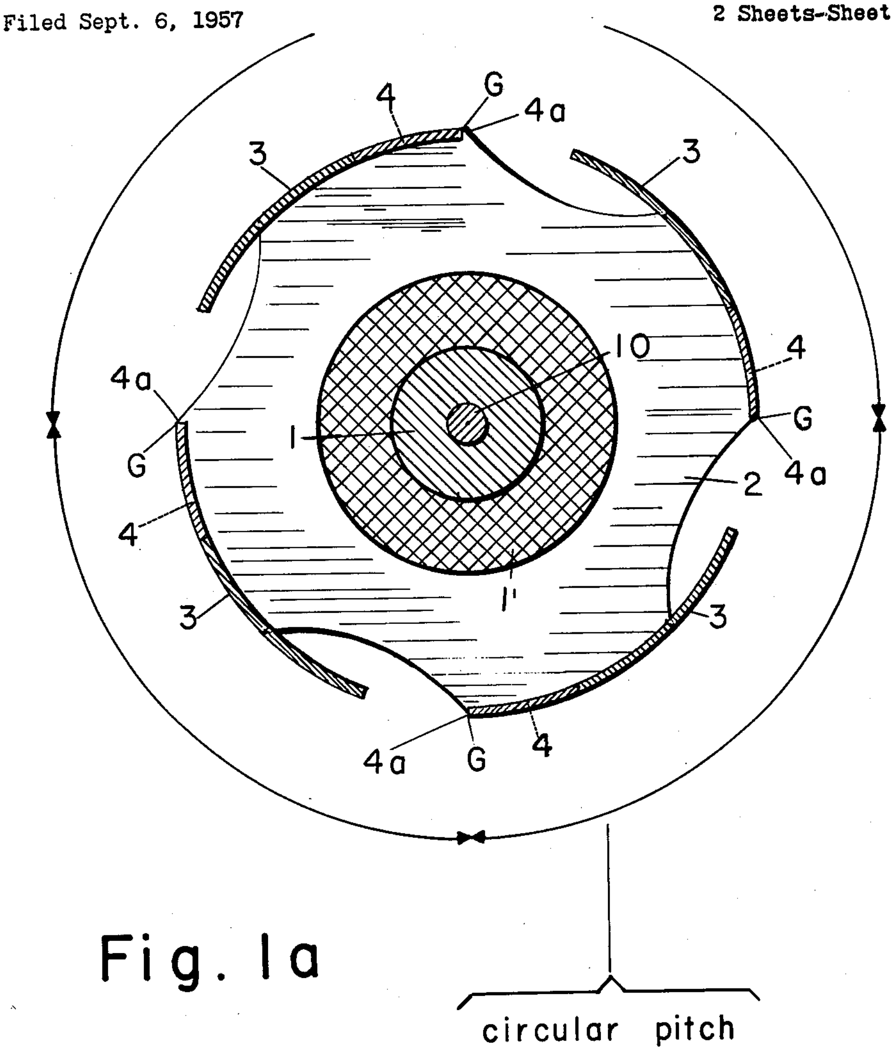

The novel features that are considered characteristic of the invention are set forth in particular in the appended claims. The invention itself, however, both as to structure and operation together with additional objects and advantages thereof will best be understood from the following detailed description of a preferred embodiment thereof when read in connection with the accompanying drawings in which FIG. 1 is an isometric view of an electromagnetic transducer embodying the invention, some parts of the same not being shown in FIG. 1, FIG. 1*a* is a section at right angles to the axis of the transducer illustrated in FIG. 1 showing only the lower portion of the same; and FIG. 2 is an isometric view of a sound recording and play-back system including an electromagnetic transducer of the type shown in FIGS. 1 and 1*a*.

Referring now to the drawing, numeral 1 has been applied to indicate a core of magnetic material. Core 1 is intended to be arranged inside of an energizing coil or winding not shown in FIGS. 1 and 2, indicated by reference character 1′ in FIG. 1*a*. The combination of coil and central core is also illustrated in the aforementioned copending application to which reference may be had in regard to this detail. The energizing coil or winding 1′ is mounted on core 1 in coaxial relation thereto. Core 1 is rotatably supported by a shaft 10 arranged in a direction longitudinally of core 1 (FIGS. 1*a* and 2). A substantially spider-shaped plate 2 of magnetizable material is arranged at the upper end of, and secured to, core 1. Another substantially spider-shaped plate 2 of magnetizable material is arranged at the lower end of, and secured to, core 1. The radially outer ends 3 of spider-shaped plates 2 are bent in conformity with a cylindrical surface coaxial to core 1 and shaft 10, i.e. the ends 3 are situated in a cylindrical surface in whose longitudinal axis shaft 10 is arranged. The bent radially outer ends 3 of plates 2 form a plurality of pairs of pole members of opposite polarity. As shown in FIGS. 1 and 2 each spider-shaped plate 2 has four arms and four bent projections thereon, forming a total of four pairs of pole members 3. It will be understood that each arm of one of plates 2 forms in effect a magnetic yoke. The number of radial extensions or arms on plates 2 can be reduced, or increased, as desired, thereby reducing or increasing the number of pairs of pole members. Each pair of pole members 3 defines a helical gap 4 therebetween substantially coextensive with the cylindrical surface defined by pole members 3. Since the structure shown in FIGS. 1 and 2 comprises four pairs of pole members 3, the four gaps 4 thereof are in the form of a four-thread screw or helix. FIG. 1 shows four wide gaps formed between the arms of spider-shaped plates 2 and their pole-member-forming bent extensions 3. It is desirable to fill these gaps to impart a continuous cylindrical outer surface to the electromagnetic transducer. To this end the transducer is provided with four filler bodies 2a clearly shown in FIG. 2 but not in FIGS. 1 and 1*a*. Filler bodies 2a are made of a relatively non-magnetic material, i.e. of a material which is not magnetic, or whose magnetic permeability is much less than that of parts 2, 3, resulting in a flux concentration in parts 2, 3. Each filler body 2 has a radially outer cylindrical surface conforming with the cylindrical surface defined by pole-member-forming extensions 3. All gaps 4 are identical, and each gap 4 encloses an angle equal to 360 degrees divided by the number of pairs of pole-member-forming bent extensions 3. In the embodiment shown in FIGS. 1 and 2 each helical gap 4 is angularly displaced 90 degrees from the two contiguous gaps 4 and each gap 4 encloses an angle of 360/4 degrees=90 degrees. In other words, the circular pitch of each helical gap is equal to 360 degrees divided by the number of pairs of extensions 3. Reference numerals 4a have been applied to indicate the lower ends of helical gaps 4 and reference numerals 4b have been applied to indicate the upper ends of helical gaps 4. The upper end 4b and the lower end 4a of contiguous gaps 4 are arranged in registry along a generatrix of the cylindrical surface defined by pole-member-forming extensions 3. A top plan view of gaps 4 is formed by four sectors of a circle, each enclosing an angle of 90 degrees, there being no overlap between contiguous or successive sectors. It will also be apparent from the foregoing that the pole-member-forming extensions 3 are substantially triangular, and that the gaps 4 are formed between the juxtaposed helical sides of extensions 3. The filler bodies 2a are preferably castings of a suitable castable material.

Figure 2:
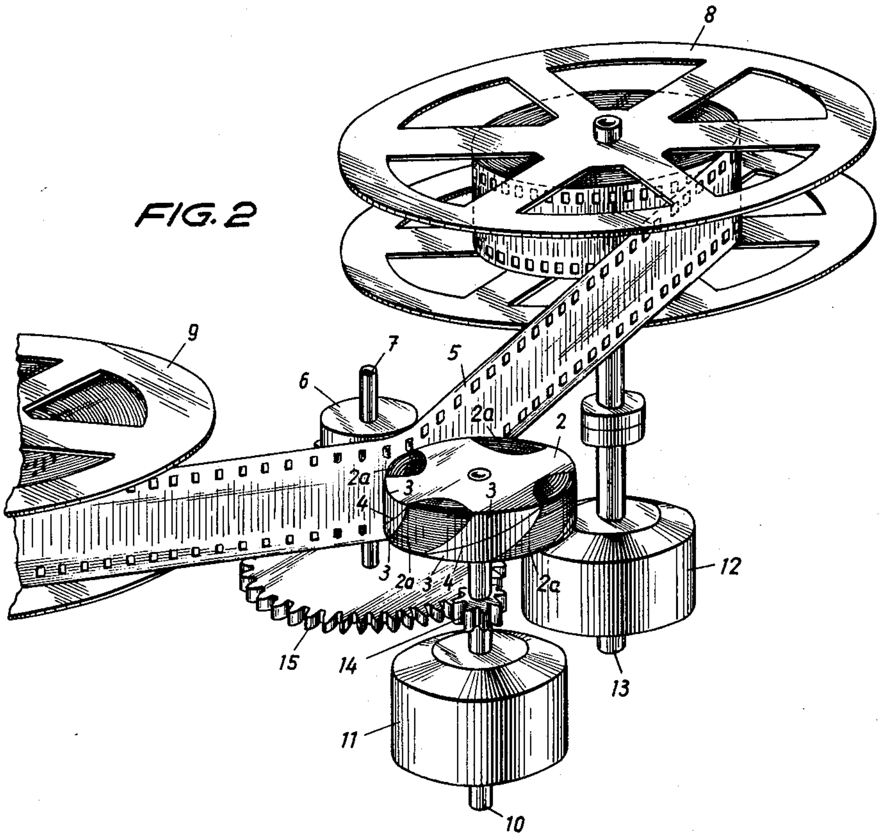

Reference numeral 8 in FIG. 2 indicates a take-up reel and reference numeral 9 indicates a supply reel for a perforated magnetic tape 5. Take-up reel 8 is driven by means of shaft 13 and motor 12. Motor 11 is provided with a shaft 10 on which the above described cylindrical transducer shown in FIGS. 1 and 1*a* is mounted. Pinion 14 mounted on shaft 10 meshes with spur gear 15 on shaft 7 of capstan 6. Capstan 6 and the recording head and play-back structure engage each other along a common generatrix, and both are being engaged by tape 5 along this generatrix. This assures perfect registry between the magnetic tracks produced on the tape by audio currents, et cetera, and the magnet gaps 4. It will be apparent that the four gaps 4 of the recording and play-back head cross the sound-tracks, or other tracks, slantingly recorded on tape 5 at right angles. This is achieved by proper selection of the ratio between gears 14 and 15.

Considering FIG. 2, it will be apparent that the axis of rotation of capstan 6 is parallel to the axis of rotation supply-reel 9 and parallel to the axis of rotation of take-up reel 8. The axis of rotation of capstan 6 is situated outside of a plane defined by the axis of rotation of supply-reel 9 and the axis of rotation of take-up reel 8, and the axis of rotation of capstan 6 is parallel to the axes of rotation of reels 8 and 9. As a result of this configuration of parts 6, 8 and 9 tape 5 engages capstan 6 along a predetermined angle, i.e. tape 5 engages capstan 6 tangentially at a predetermined angle, is wound a predetermined angle around capstan 6 and leaves capstan 6 tangentially at another predetermined angle. In other words, capstan 6 is arranged in such a way in the space between reels 8 and 9 as to be engaged by tape 5 along a predetermined angle, or portion of its cylindrical surface. Tape 5 does not engage the cylindrical surface of the transducer along an angle or a portion of its surface; it engages that surface merely along a line which is the generatrix common to capstan or rotatable cylindrical tape-guide 6 and the cylindrical surface of the transducer. When capstan 6 and the transducer rotate the helical gaps 4 of the latter intersect with said common generatrix of both and these intersections form series of points on tape 5 defining a family of slanting recording or scanning lines of equal slope. The configuration of tape 5 may also be described as a bulge tangentially engaging the cylindrical surface of the rotatable transducer. Capstan 6 is adapted to drive tape 5 in the direction of the circumferential velocity of the cylindrical surface of the transducer at the point of tangential engagement thereof by tape 5. When tape 5 is being moved through the nip formed between capstan 6 and the cylindrical surface of the rotating electromagnetic transducer, a point-form engagement is effected between helical gaps 4 and tape 5, the sum total of which forms the above referred-to family of slanting recording or scanning lines of equal slope.

In FIG. 1*a* reference character G has been applied to indicate four generatrices of the cylindrical transducer surface each defining the position of the upper end of one helical gap 4 and the position of the lower end 4a of another helical gap 4. Because of the way the section plane of FIG. 1*a* extends, that figure does not show the upper ends 4b of the helical gaps 4 shown in FIG. 1. In drawing FIG. 1*a* no portion of the structure situated above the section plane has been shown. The circular pitch of 90 degrees of the structure has been indicated in FIG. 1*a* by an appropriate legend. The very instant one of gaps 4 has terminated its recording or play-back function, the gap 4 immediately adjacent begins to record or to reproduce another magnetic track.

While this invention has been disclosed in accordance with the provisions of patent statutes, it is to be understood that various changes and modifications may be made without departing from the spirit and scope of the invention. It is desired, therefore, that the appended claims be given broadest reasonable construction permissible in the light of the prior art.

It is claimed:

1. A magnetic tape recording and play-back device comprising a supply-reel; a take-up reel; a capstan arranged in such a way in the space between said supply reel and said take-up reel as to be engaged along a predetermined angle by tape running from said supply reel to said take-up reel, and a rotatable electromagnetic transducer having a cylindrical surface adapted to linearly engage said capstan along a common generatrix of said capstan and said cylindrical surface to effect linear engagement only between said cylindrical surface and tape running from said supply-reel to said take-up reel, said transducer comprising magnetic pole members of opposite polarity defining therebetween a plurality of helical magnetic gaps all situated in said cylindrical surface and each having an angular extent equal to 360 degrees divided by the number of said gaps, and said transducer further comprising one single magnet coil and magnetic means for linking with said coil the magnetic flux across each of said plurality of helical magnetic gaps.

2. A magnetic tape recording and play-back device comprising a supply-reel; a take-up reel; a rotatable cylindrical tape-guide arranged in such a way between said supply reel and said take-up reel as to be engaged along a predetermined angle by tape running from said supply-reel over said tape-guide to said take-up reel; an electromagnetic transducer rotatable about an axis parallel to the axis of rotation of said cylindrical tape-guide, said transducer comprising a magnet system having a plurality of pole members of opposite polarity defining therebetween a plurality of helical magnetic gaps, said plurality of pole members and said plurality of helical magnetic gaps being situated in a cylindrical surface coaxial with the axis of rotation of said transducer and tangentially engaging said cylindrical tape-guide, each of said plurality of helical gaps having an angular extent of 360 degrees divided by the number of said gaps, said magnet system including one single magnet coil and magnetic means for linking with said coil the magnetic flux across each of said plurality of helical magnetic gaps; and a magnetic tape running from said supply-reel through the nip formed between said cylindrical tape-guide and said plurality of pole members to said take-up reel whereby a point-form engagement is effected between said plurality of helical magnetic gaps and said tape.

3. A magnetic tape recording and play-back device comprising a rotatable supply-reel; a take-up reel arranged to rotate about an axis parallel to the axis of rotation of said supply-reel; a capstan having an axis of rotation parallel to the axis of rotation of said supply-reel and to the axis of rotation of said take-up reel, said axis of rotation of said capstan being situated in a plane outside of the plane defined by said axis of rotation of said supply-reel and said axis of rotation of said take-up reel; an electromagnetic transducer having a plurality of pole members defining a cylindrical surface tangentially engaging said capstan, pairs of said plurality of pole members of opposite polarity forming therebetween helical gaps situated in said cylindrical surface, said helical gaps being angularly displaced and the angle enclosed by each of said plurality of helical gaps being equal to 360 degrees divided by the number of said pairs of pole members, and said transducer further comprising one single magnet coil and magnetic means for linking with said magnet coil the magnetic flux across each of said plurality of helical gaps.

4. A device for storing impressions of electric signal currents on a magnetic recording tape and for reproducing said impressions in form of electric signal currents comprising a magnetic core; an energizing winding mounted on said core; a first system of magnetic arms projecting radially outwardly from the upper end of said core; a second system of magnetic arms projecting radially outwardly from the lower end of said core; the radially outer ends of each said first system of arms and of said second system of arms being bent to conform with a cylindrical surface coaxial with said core, said radially outer ends defining a plurality of helical gaps therebetween situated substantially in said cylindrical surface, the axially outer ends of immediately adjacent gaps being situated on common generatrices of said cylindrical surface; filler means of relatively non-magnetic material arranged in the space defined by said first system of arms and said second system of arms and having a radially outer surface conforming with said cylindrical surface; a shaft adapted to rotate said core, said winding, said first system of arms, said second system of arms and said filler means about said axis of said cylindrical surface; and drive means for moving said tape in a direction longitudinally thereof past said plurality of helical gaps, said drive means including a capstan adapted to rotate about an axis parallel to said axis of said cylindrical surface and to tangentially engage said cylindrical surface along a generatrix thereof.

5. A device for storing magnetic impressions of electric signal currents on a magnetic recording tape and for reproducing said impressions in form of electric signal currents comprising a magnetic core; a first shaft arranged in a direction longitudinally of said core rotatably supporting said core; an energizing winding mounted on said core in coaxial relation to said first shaft; a first substantially spider-shaped plate of magnetic material having a predetermined number of radial arms arranged at the upper end of said core; a second substantially spider-shaped plate of magnetic material having a number of radial arms equal to said predetermined number arranged at the lower end of said core; the radially outer ends of said arms of said first plate and of said arms of said second plate being bent to conform with a cylindrical surface coaxial to said first shaft, said ends forming a plurality of pairs of pole members of opposite polarity, each of said plurality of pairs of pole members defining a helical gap therebetween situated substantially in said cylindrical surface and having a circular pitch equal to 360 degrees divided by said predetermined number; a plurality of filler bodies of relatively non-magnetic material each arranged in spaces formed between different pairs of pole members of opposite polarity and each having a radially outer surface conforming with said cylindrical surface; and drive means for moving said tape in a direction longitudinally thereof past said cylindrical surface, said drive means including a capstan supported by a second shaft parallel to said first shaft, and said capstan being adapted to engage said cylindrical surface along a generatrix thereof.

6. A magnetic device for recording and reproducing electrical signal currents comprising a rotatable electromagnetic transducer having a central rotatable core, a rotatable magnet coil mounted on said core, and rotatable magnetic yoke elements extending radially outwardly from the upper end of said core and from the lower end of said core and including a plurality of pairs of pole members of opposite polarity defining a cylindrical surface coaxial with said core, each pair of said plurality of pairs of pole members being spaced by a helical gap situated substantially in said cylindrical surface, the end of one of each helical gap situated adjacent the upper end of said core and the end of one of each helical gap situated adjacent the lower end of said core being positioned on the same generatrix of said cylindrical surface, and drive means adapted to move magnetic recording tape in a direction longitudinally thereof past said helical gap between each pair of said plurality of pairs of pole members and adapted to maintain said tape in linear engagement with said cylindrical surface, said drive means including a substantially cylindrical capstan arranged to rotate about an axis parallel to the axis of said cylindrical surface and to tangentially engage said cylindrical surface along a generatrix thereof.

7. A magnetic recording device for electric currents comprising a magnetic recording tape, a rotatable electromagnetic recording head having a cylindrical surface tangentially engaged by said tape only along a generatrix of said cylindrical surface, said recording head including a plurality of pairs of magnetic pole members of opposite polarity defining a predetermined number of helical gaps therebetween situated in said cylindrical surface, the circular pitch of each of said helical gaps being equal to 360 degrees divided by said predetermined number, and a capstan adapted to drive said tape in the direction of the circumferential velocity of said cylindrical surface at the point of tangential engagement thereof by said tape.

8. An electromagnetic transducer for magnetic devices for recording intelligence on an elongated magnetic storage means substantially in tape-form movable in a direction longitudinally thereof and for reproducing intelligence from such a storage means, said transducer comprising means defining a cylindrical surface, said cylindrical surface defining means including a plurality of pairs of pole members of opposite polarity defining a plurality of substantially identical angularly displaced helical gaps situated substantially in said cylindrical surface, the circular pitch of each of said plurality of helical gaps being equal to 360 degrees divided by the number of said pairs of pole members, a common energizing winding arranged to energize each and to be energized by each of said plurality of pairs of pole members, and a capstan adapted to rotate about an axis parallel to the axis of said cylindrical surface and tangentially engaging said cylindrical surface along a generatrix thereof.

9. An electromagnetic transducer for magnetic devices for recording intelligence on magnetizable tape movable in a direction longitudinally thereof and for reproducing intelligence from magnetized tape, said transducer comprising a rotatable central magnetic core, a winding coaxially mounted on said core and a plurality of pairs of magnetic yoke elements extending radially outwardly from said core, said plurality of pairs of yoke elements forming a plurality of pairs of pole members of opposite polarity situated in a cylindrical surface coaxial with said core, said plurality of pairs of pole members defining a plurality of helical gaps substantially coextensive with said cylindrical surface, each of said plurality of gaps having an upper end and a lower end, and the upper end and the lower end of each of said plurality of gaps being arranged in registry along one of a plurality of angularly displaced generatrices of said cylindrical surface, and a capstan adapted to rotate about an axis parallel to the axis of said cylindrical surface and tangentially engaging said cylindrical surface along a generatrix thereof.

References Cited in the file of this patent

UNITED STATES PATENTS

| | | |
|---|---|---|
| 2,352,023 | Schuller | June 20, 1944 |
| 2,656,419 | Dingley | Oct. 20, 1953 |
| 2,800,384 | Parker | July 23, 1957 |
| 2,819,349 | Hall | Jan. 7, 1958 |